June 13, 1950          F. J. BRADBURY          2,511,765
COUPLING DEVICE FOR PIPES, TUBES, AND THE LIKE
Filed Sept. 2, 1948
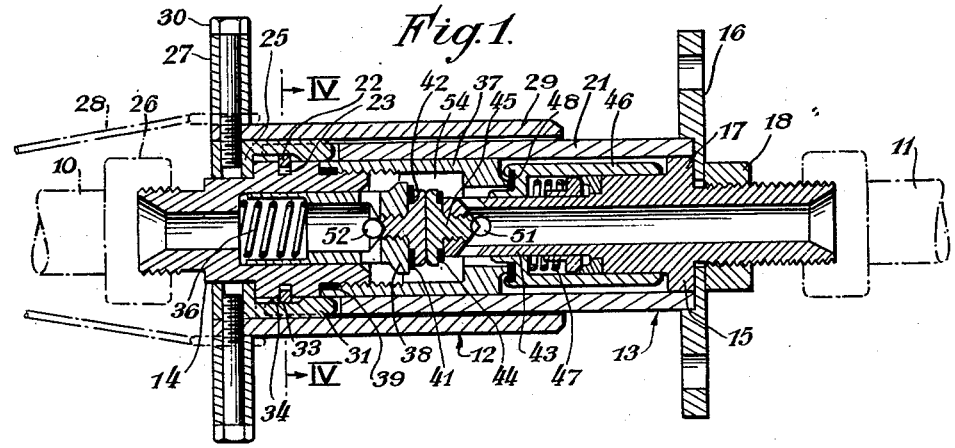
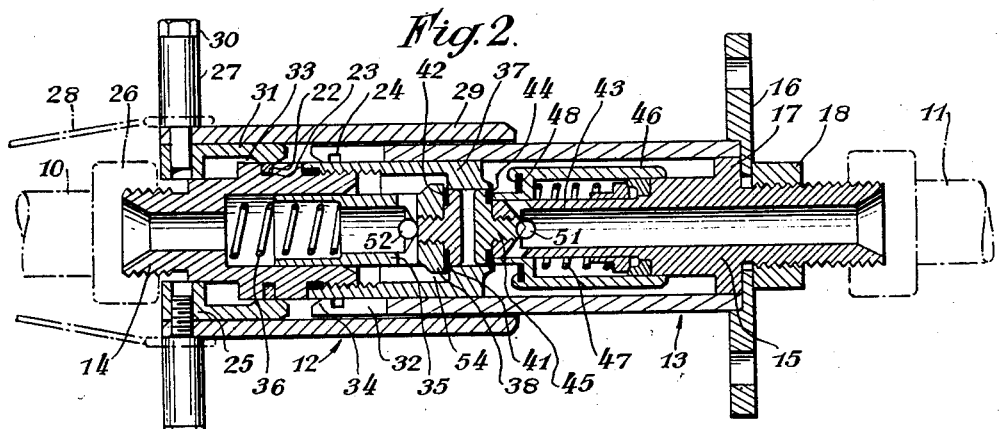
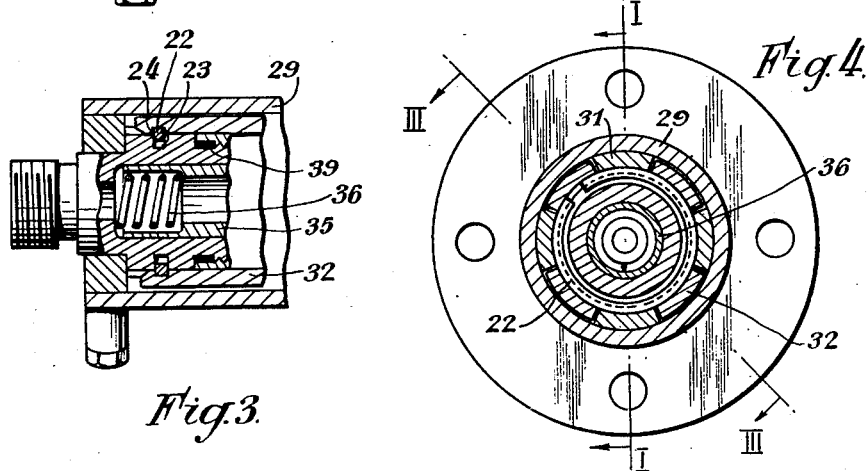
FREDERICK J. BRADBURY INVENTOR
BY Beaman & Patch
ATTORNEY Patented June 13, 1950

2,511,765

UNITED STATES PATENT OFFICE 2,511,765

COUPLING DEVICE FOR PIPES, TUBES, AND THE LIKE

Frederick James Bradbury, Leamington Spa, England, assignor, by mesne assignments, to Aeroquip Corporation, Jackson, Mich.

Application September 2, 1948, Serial No. 47,392
In Great Britain September 16, 1947

2 Claims. (Cl. 284—18)

This invention relates to coupling devices for pipes, tubes and the like and more particularly to coupling devices comprising a pair of readily disconnectible coupling elements, each of which incorporates a valve member arranged to close the end of a corresponding pipe-line when the coupling is disconnected; the action of connecting the coupling elements together automatically moving each of the valve elements to the open position thereby producing a free passage for the flow of a fluid through the coupling device.

An object of the present invention is to provide a coupling device of such construction that the connection can be easily and quickly made and broken.

A further object of the invention is to provide a coupling device having releasing means whereby an axial pull applied to one of the coupling elements will disconnect the coupling device without damage to the associated pipe-lines or the coupling elements.

According to the invention a coupling device for pipes, tubes and the like comprises a pair of coupling elements, a locking member, adapted to maintain the coupling elements in a connected position, and a releasing member supported by one of the coupling elements in such a manner that the releasing member may be moved relative to its supporting coupling element so as to move the locking member to a position which permits the coupling elements to be disconnected.

Further according to the invention a coupling device for pipes, tubes and the like comprises a first coupling element and a second coupling element adapted to fit within the first, a locking member engaging both elements when in the connected position and a releasing member slidably mounted on the second coupling element, the arrangement being such that the locking member may be caused to disengage from the first coupling element by movement of the releasing member relative to said second coupling element.

Further according to the invention a coupling device for pipes, tubes and the like comprises a tubular first coupling element and a second coupling element adapted to fit co-axially within the first, a circular spring clip adapted to fit within corresponding grooves formed in the inner surface of the first member and the outer surface of the second, and a releasing sleeve slidably mounted on the second coupling element and capable of compressing the circular spring clip into the groove in the said second coupling element and out of engagement with the first coupling element.

The invention is illustrated by way of example in the accompanying drawings, in which—

Figure 1 is a sectional elevation on line I—I of Figure 4 of a coupling device constructed according to the invention showing the two coupling elements in the connected position.

Figure 2 is a similar view to Figure 1 showing the two coupling elements in the disconnected position.

Figure 3 is a section on line III—III of Figure 4.

Figure 4 is a section on line IV—IV of Figure 1.

In a preferred embodiment of the invention the coupling device connects the flexible hydraulic pipe-line 10 in the braking system of a tractor vehicle with the pipe-line 11 of its trailer vehicle. The coupling device comprises two coupling elements 12 and 13, each of which has a body portion 14 and 14 connected to the respective flexible hydraulic pipe-lines of the tractor and trailer. The coupling element associated with the trailer is provided with a circular securing plate 16 which is held in position against an annular flange 17 on the body portion of the coupling element by a securing nut 18. The coupling element 13 is also provided with a sleeve 21 which surrounds the body portion 15 and is rigidly attached to the securing plate 16 by copper brazing. In the connected position of the coupling device the outer extremity of the sleeve 21 is also disposed around the body portion 14 of the tractor coupling element, the two parts being held together by a circular spring clip 22 which engages within annular grooves 23 and 24 formed respectively in the body portion 14 of the tractor coupling element and the sleeve 21 of the trailer coupling element. A releasing sleeve 25 is supported on the body portion 14 of the tractor coupling and is allowed an axial movement relative to the body portion, the movement being limited by the connecting nut 26 of the flexible pipe-line 10. The releasing sleeve 25 is surrounded by an external sleeve 29 and carries two radially extending arms 27 held in position by bolts 30 which are loosely connected to the tractor by connecting wires 28, the wires being shorter in length than the corresponding section of the flexible pipe-line 10 so that any strain applied will be taken first by the releasing sleeve 25 of the coupling device and not by the flexible pipe-line. The releasing sleeve is also formed with four axially extending projections or fingers 31 which are arranged to engage snugly between four corresponding projections 32 formed at the outer extremity of the sleeve 21 of the trailer coupling element. The outer extremities of the projections 31 are slidably supported on the body portion of the tractor coupling element but are cut away or recessed towards their inner extremities in order to form an annular recess or housing 33 for the circular spring clip 22. When the coupling device is connected, the circular spring clip is in engagement with the groove 24 in the sleeve 21 of the trailer coupling element, which groove is formed across the projections 32 of the sleeve.

In the event of the tractor being uncoupled from the trailer and the hydraulic brake-line connection overlooked, as soon as the tractor moves away from the trailer, the connecting wires 28 to the releasing sleeve 25 will become taut and slide the sleeve relatively to the body portion 14 of the tractor coupling element pulling it towards the nut 26. The circular spring clip 22 is positively located by the groove 23 in the body portion of the tractor coupling element and consequently the projections 31 are drawn across the outer edge of the circular spring clip 22. When the ramp-like outer extremities of the projections approach the circular spring clip 22 they act to compress it radially into the groove 23 of the body portion of the coupling element 14, which thus withdraws the outer edge of the circular spring clip from the groove 24 in the sleeve of the trailer coupling element 21, and thus automatically disconnects the parts without damage to the coupling elements or the pipe lines. In the disconnected position, shown in Figure 2, the circular spring clip 22 is retained within the groove 23 by the projections 31 of the releasing sleeve and remains pressing resiliently against the projections until the coupling device is reconnected, reconnecting being carried out by pressing the coupling elements together.

In order to facilitate re-connection of the coupling elements, the outer extremity of the sleeve of the trailer coupling element is chamfered or cut away internally so that as the sleeve mates with the releasing sleeve 25, the chamfered edge 34 rides over the circular spring clip 22 and can move to its coupled position. As shown in Figure 1 the sleeve 29 is arranged to fit snugly around the sleeve of the trailer coupling element 21 when the parts are connected.

In the embodiment of the invention illustrated in the accompanying drawings, a pair of valve members are provided within the body portion of each coupling element to seal off pipes 10 and 11 when the coupling elements are disconnected.

Slidably mounted within the body portion 14 of the tractor coupling element is a valve member 35 which in the disconnected position shown in Figure 2 is urged by the spring 36 into contact with an internal shoulder formed on the tubular extension 37 screwed to the body portion 14, thus sealing the pipe line 10. Leakage of fluid along the screw thread is prevented by the seal 39. The head 38 of the valve 35 carries a sealing washer 41 which is held in position by the screw 42. The sealing washer ensures a fluid tight joint between the internal shoulder of the extension 27 and the valve member 35. The second valve member comprises an integral extension 43 of the body portion 15 of the trailer coupling element 13 on one end of which is a sealing washer 44 held in position by the screw 45, and a tubular member 46 slidable on the body portion 15 and as shown in Figure 2, urged into contact with the sealing washer 45 when the coupling elements are disconnected by the spring 47, thus sealing the end of the pipe line 11. The member 46 also carries a second sealing washer 48 which is brought into close contact with the end of the tubular extension 37 when the coupling elements are connected.

When the coupling elements are disconnected the ends of the pipe line 10 and 11 are sealed as described above and as shown in Figure 2. On connecting the coupling elements together the heads of the screws 42 and 45 are brought into contact and the application of pressure to the ends of the coupling elements forces the valve member 35 back against the pressure of the spring 36. The end of the extension 37 is also brought into contact with the sealing member 48 and the tubular member 46 is forced back against the pressure of the spring 47 uncovering the four holes 51 drilled radially in the extension 43. The connection is completed when the groove 24 engages with the circular spring clip 22. There is then a passage for the fluid from pipe line 10 to pipe line 11 via holes 52, chamber 54 and holes 51. Leakage of fluid is prevented by means of the fluid-tight joint formed between the end of the extension 37 and the sealing washer 48.

While the embodiment of the invention described above is for joining hydraulic pipe lines, other embodiments of the invention may be used for coupling, for example, the electric supply cables between railway vehicles, the body portions of the coupling elements carrying suitable plug and socket connectors.

What I claim is:

1. A coupling device for pipes, tubes and the like, comprising a tubular first coupling element, a second tubular coupling element adapted to fit co-axially within the first, a circular spring clip adapted to fit within corresponding grooves formed in the inner surface of the first coupling element and in the outer surface of the second coupling element, a releasing sleeve slidably mounted on the second coupling element and capable of compressing the circular spring clip into the groove in the said second coupling element and out of engagement with the first coupling element, and circumferentially spaced axially extending projections at one end of said first coupling element and said releasing sleeve adapted and arranged such that when the coupling device is in the connected position the projections on the said first coupling element and those of the releasing sleeve lie in the spaces between the projections of the other.

2. A coupling device as claimed in claim 1 wherein the projections on the releasing sleeve are recessed on their inner surfaces to define an annular recess for the circular spring clip and have ramp-like outer extremities adapted to contact and compress the clip into the release position when the tubular coupling elements are slid relatively to one another in the automatic disconnecting direction.

FREDERICK JAMES BRADBURY.

REFERENCES CITED

The following references are of record in the file of this patent:

UNITED STATES PATENTS

| Number | Name | Date |
| --- | --- | --- |
| 152,413 | Rhinehart | June 23, 1874 |
| 1,867,296 | Woodruff | July 12, 1932 |
| 2,069,377 | Matthiessen, Jr. | Feb. 2, 1937 |
| 2,092,116 | Hansen | Sept. 7, 1937 |
| 2,111,956 | Baldwin | Mar. 22, 1938 |
| 2,253,018 | Cowles | Aug. 19, 1941 |
| 2,425,500 | Wiggins | Aug. 12, 1947 |
| 2,441,363 | Krueger | May 11, 1948 |